(12) United States Patent
Centner

(10) Patent No.: US 12,296,410 B2
(45) Date of Patent: May 13, 2025

(54) WIRE LINER RETENTION APPARATUS, WELDING TORCHES, AND METHODS

(71) Applicant: Illinois Tool Works Inc., Glenview, IL (US)

(72) Inventor: Robert J. Centner, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 653 days.

(21) Appl. No.: 17/518,675

(22) Filed: Nov. 4, 2021

(65) Prior Publication Data

US 2022/0161371 A1 May 26, 2022

Related U.S. Application Data

(60) Provisional application No. 63/215,146, filed on Jun. 25, 2021, provisional application No. 63/117,233, filed on Nov. 23, 2020.

(51) Int. Cl.
| | |
|---|---|
| *B23K 35/02* | (2006.01) |
| *B23K 9/12* | (2006.01) |
| *B23K 9/173* | (2006.01) |
| *B23K 9/26* | (2006.01) |
| *B23K 9/29* | (2006.01) |

(52) U.S. Cl.
CPC .......... *B23K 35/0294* (2013.01); *B23K 9/123* (2013.01); *B23K 9/173* (2013.01); *B23K 9/26* (2013.01); *B23K 9/291* (2013.01)

(58) Field of Classification Search
CPC .... B23K 35/0294; B23K 9/123; B23K 9/173; B23K 9/26; B23K 9/291
See application file for complete search history.

(56) References Cited

U.S. PATENT DOCUMENTS

| | | | |
|---|---|---|---|
| 10,610,948 B2 | 4/2020 | Hassan | |
| 2009/0152255 A1 | 6/2009 | Ma | |
| 2016/0082540 A1* | 3/2016 | Hassan | B23K 9/164 |
| | | | 219/137.42 |
| 2017/0165780 A1* | 6/2017 | Centner | B23K 9/295 |
| 2017/0282278 A1 | 10/2017 | Centner | |

FOREIGN PATENT DOCUMENTS

DE          20214561          11/2002

OTHER PUBLICATIONS

Canadian Office Action Appln No. 3,138,426 dated Jan. 5, 2024.
European Office Communication with extended European Search Report Appln No. 212081170.7 dated Apr. 14, 2022.
Canadian Office Action Appln No. 3,138,426 dated Mar. 11, 2025.

* cited by examiner

*Primary Examiner* — Brian W Jennison
(74) *Attorney, Agent, or Firm* — McAndrews, Held & Malloy, Ltd.

(57) ABSTRACT

An example wire liner retention apparatus includes: a body comprising a bore extending longitudinally through the body, the bore configured to permit passage of a welding wire liner through the bore; a clamp configured to apply a compressive force to the welding wire liner in a radial direction within the bore to limit movement of the welding wire liner with respect to the body; and a compression adjustment mechanism configured to adjust the compressive force applied by the clamp.

16 Claims, 13 Drawing Sheets

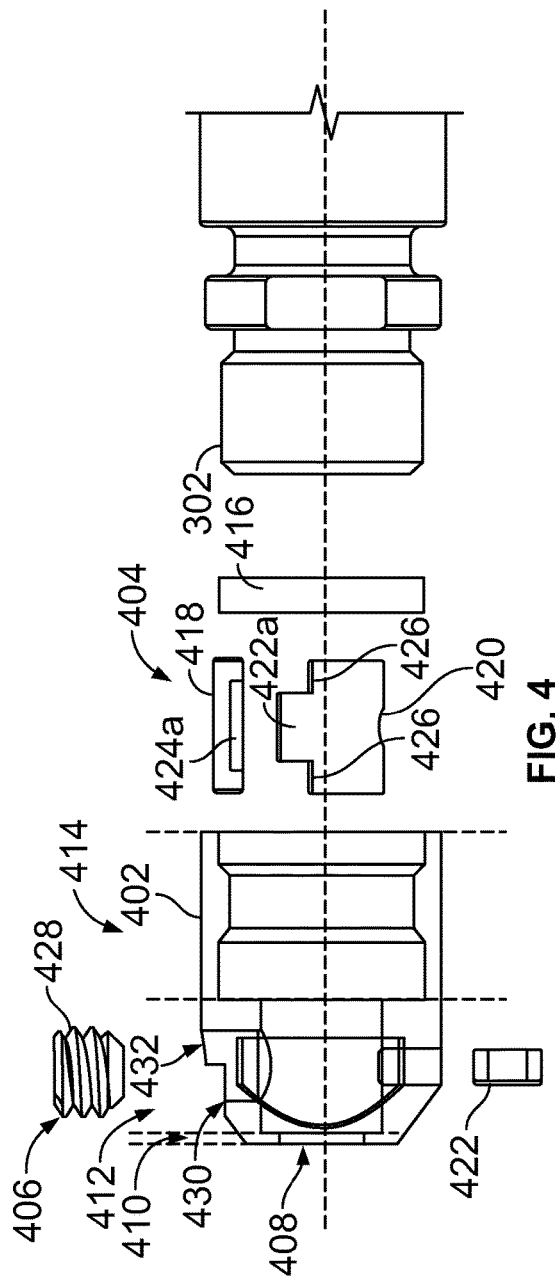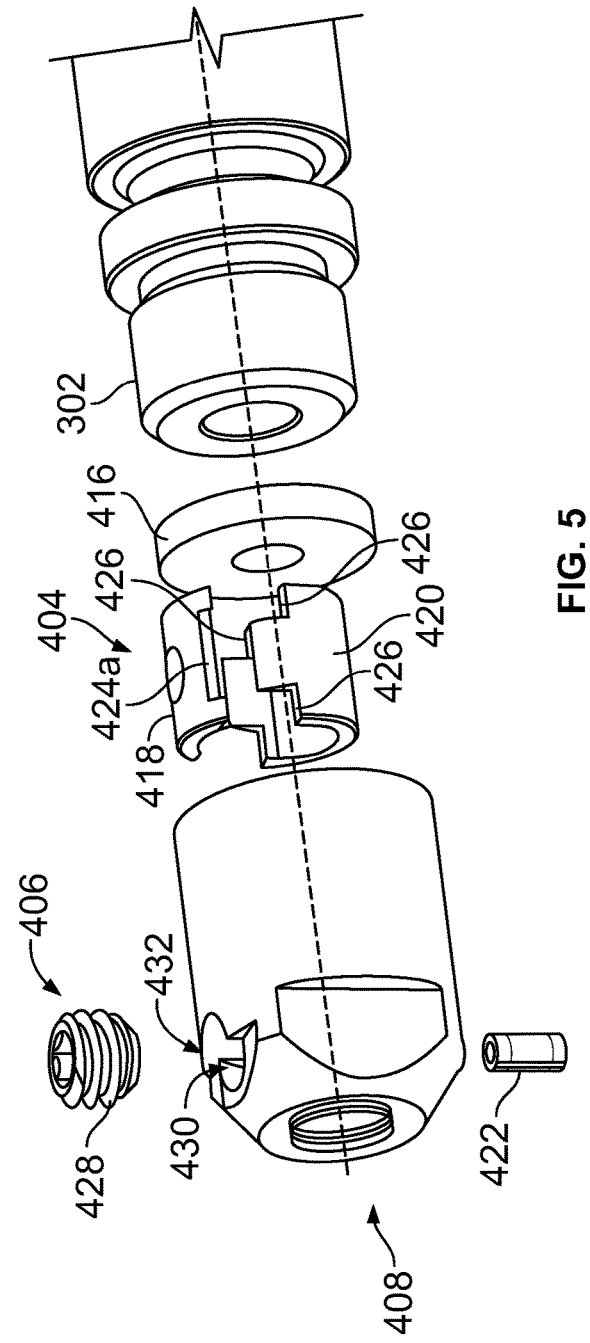

WIRE LINER RETENTION APPARATUS, WELDING TORCHES, AND METHODS

RELATED APPLICATIONS

The present application claims the benefit of U.S. Provisional Patent Application Ser. No. 63/117,233, filed Nov. 23, 2020, entitled "WIRE LINER RETENTION APPARATUS, WELDING TORCHES, AND METHODS," and to U.S. Provisional Patent Application Ser. No. 63/215,146, filed Jun. 25, 2021, entitled "WIRE LINER RETENTION APPARATUS, WELDING TORCHES, AND METHODS." The entireties of U.S. Provisional Patent Application Ser. No. 63/117,233 and U.S. Provisional Patent Application Ser. No. 63/215,146 are expressly incorporated herein by reference.

BACKGROUND

This disclosure relates generally to welding torches and, more particularly, to wire liner retention apparatus, welding torches, and methods.

Limitations and disadvantages of conventional and traditional approaches will become apparent to one of skill in the art, through comparison of such systems with the present disclosure as set forth in the remainder of the present application with reference to the drawings.

BRIEF SUMMARY

Wire liner retention apparatus, welding torches, and methods are disclosed, substantially as illustrated by and/or described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples, as illustrated in the accompanying figures.

FIG. 4 is an exploded side elevation view of the example power connection assembly and wire liner retention device of FIG. 3.

FIG. 5 is an exploded perspective view of the example power connection assembly and wire liner retention device of FIG. 3.

Where appropriate, the same or similar reference numbers are used to refer to the same or similar elements. The figures are not necessarily to scale.

DETAILED DESCRIPTION

Figure 1:
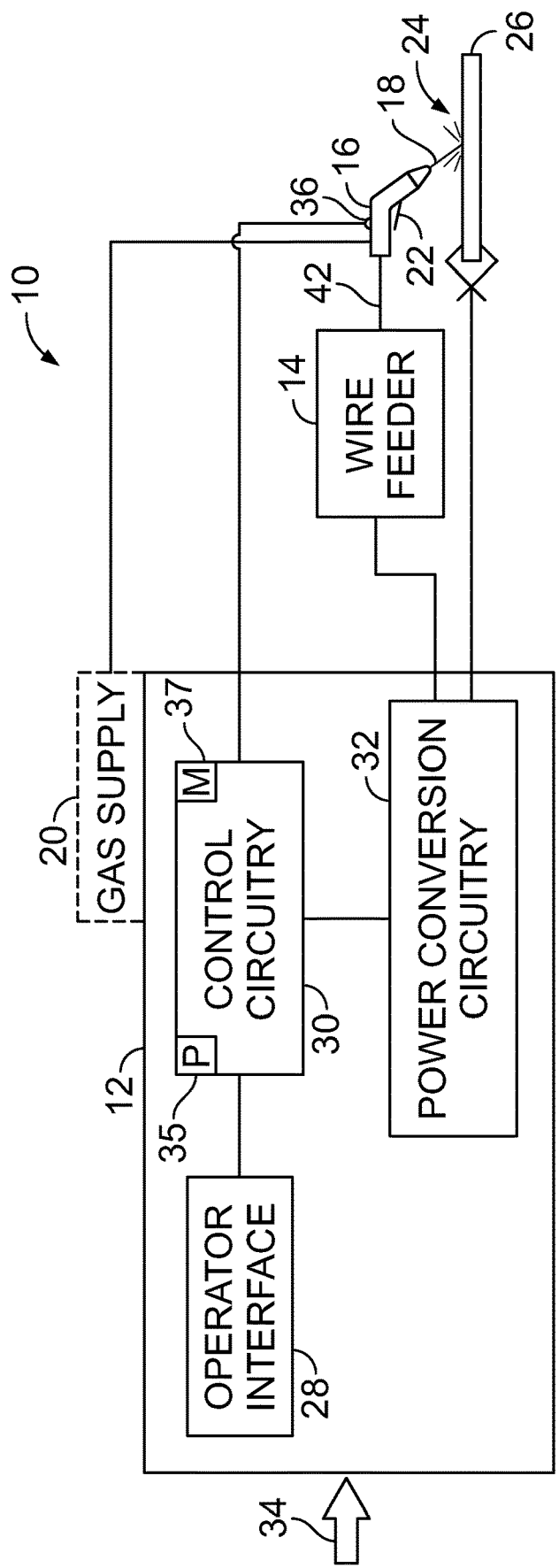
FIG. 1 illustrates an example of a gas metal arc welding (GMAW) system with a power source and a wire feeder, in accordance with aspects of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "rear," "upper," "lower," and the like, are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

The term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

The terms "circuit" and "circuitry" includes any analog and/or digital components, power and/or control elements, such as a microprocessor, digital signal processor (DSP), software, and the like, discrete and/or integrated components, or portions and/or combinations thereof.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards, which form part or all of a controller, and are used to control a welding process, a device such as a power source or wire feeder, motion, automation, monitoring, air filtration, displays, and/or any other type of welding-related system.

The term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EE-PROM), flash memory, solid state storage, a computer-readable medium, or the like.

The term "torch," "welding torch," "welding tool," or "welding-type tool" refers to a device configured to be manipulated to perform a welding-related task, and can include a hand-held welding torch, robotic welding torch, gun, or other device used to create the welding arc.

In wire-fed welding processes, wire liners are used to line the path between a source of welding wire (e.g., filler wire) and the welding torch (e.g., a GMAW torch, an FCAW torch, a SAW torch, etc.). The welding wire liner is secured in place at the end of the welding torch cable at which the welding torch is connected and disconnected from the wire feeder (e.g., at a power connection assembly), because movement of the wire liner relative to the power connection assembly (referred to herein as "wire liner movement") can adversely affect welds made using the torch. Potential effects of wire liner movement include gas leakage at the power pin (e.g., leading to weld porosity), wire feeding issues, and/or liners dragging on feeder drive rolls.

Conventional welding wire liners avoid wire liner movement by using a permanently affixed "liner lock" that is attached to one end of the liner. Rear-end liner locks are attached at the end of the liner that is closest to the wire feeder, while front-end liner locks are attached at the end of the liner that is closest to the contact tip.

When fully installed, rear liner locks abut the power pin that transfers electrical power from the wire feeder to the welding cable conductors. Welding wire liners are manufactured to be longer than needed, and require measurement and trimming to the correct length at the time of installation, which can be time consuming and error prone for the weld operator to perform. Additionally, some conventional rear liner lock designs can be difficult to properly install and/or can result in inconsistent performance (e.g., allowing movement of the liner even when installed). Conversely, front liner locks enable installation through the welding torch (e.g., at the neck of the welding torch), and provides for easier trimming of the welding wire liner without measurement.

Disclosed wire liner retention apparatus, welding torches, and methods provide for front loading of welding wire liners, ease of installation of the wire liner retention device, trimming of the installed welding wire liner without requiring measuring the welding wire liner, and consistent performance in limiting movement of the welding wire liner with respect to the power pin.

In some examples, a wire retention device includes a body (also referred to herein as a "cap"), which as a bore extending longitudinally through the body. The welding wire liner is fed through the bore and retained within the bore. The wire retention device further includes a clamp to apply a compressive force to the welding wire liner in a radial direction within the bore. When installed (e.g., tightened), the clamp limits movement of the welding wire liner with respect to the body. The wire retention device further includes a compression adjustment mechanism, which is used to adjust the compressive force applied by the clamp.

FIG. 1 illustrates an example of a gas metal arc welding (GMAW) system 10 with a power source 12 and a wire feeder 14. In the illustrated example, the power source 12 is separate from the wire feeder 14, such that the wire feeder 14 may be positioned at some distance from the power source 12 near a welding location. However, it should be understood that the wire feeder 14, in some implementations, may be integral with the power source 12. The power source 12 may supply weld power to a torch 16 through the wire feeder 14, or the power source 12 may supply weld power directly to the torch 16. The wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. An operator may engage a trigger 22 of the torch 16 to initiate an arc 24 between the electrode 18 and a work piece 26. In some examples, the welding system 10 may be triggered by an automation interface including, but not limited to, a programmable logic controller (PLC) or robot controller. The welding system 10 is designed to provide welding wire (e.g., electrode 18), weld power, and shielding gas to the welding torch 16. As will be appreciated by those skilled in the art, the welding torch 16 may be of many different types, and may facilitate use of various combinations of electrodes 18 and gases.

The welding system 10 may receive data settings from the operator via an operator interface 28 provided on the power source 12. The operator interface 28 may be incorporated into a faceplate of the power source 12, and may allow for selection of settings such as the weld process (e.g., stick, TIG, MIG), the type of electrode 18 to be used, voltage and current settings, transfer mode (e.g., short circuit, pulse, spray, pulse), and so forth. In particular, the welding system 10 allows for MIG welding (e.g., pulsed MIG welding) with electrodes 18 (e.g., welding wires) of various materials, such as steel or aluminum, to be channeled through the torch 16. The weld settings are communicated to control circuitry 30 within the power source 12.

The control circuitry 30 operates to control generation of welding power output that is applied to the electrode 18 by power conversion circuitry 32 for carrying out the desired welding operation. For example, the control circuitry 30 may be adapted to regulate a pulsed MIG welding regime that may have aspects of short circuit transfer and/or of spray transfer of molten metal from the welding wire to a molten weld pool of a progressing weld. Such transfer modes may be controlled during operation by adjusting operating parameters of current and voltage pulses for arcs 24 developed between the electrode 18 and the work piece 26.

The control circuitry 30 is coupled to the power conversion circuitry 32, which supplies the weld power (e.g., pulsed waveform) that is applied to the electrode 18 at the torch 16. The power conversion circuitry 32 is coupled to a source of electrical power as indicated by arrow 34. The power applied to the power conversion circuitry 32 may originate in the power grid, although other sources of power may also be used, such as power generated by an engine-driven generator, batteries, fuel cells or other alternative sources. Components of the power conversion circuitry 32 may include choppers, boost converters, buck converters, inverters, and so forth.

The control circuitry 30 controls the current and/or the voltage of the weld power supplied to the torch 16. The control circuitry 30 may monitor the current and/or voltage of the arc 24 based at least in part on one or more sensors 36 within the wire feeder 14 or torch 16. In some embodiments, a processor 35 of the control circuitry 30 determines and/or controls the arc length or electrode extension based at least in part on feedback from the sensors 36. The arc length is defined herein as the length of the arc between the electrode 18 and the work piece 26. The processor 35 determines and/or controls the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30. Operation of the power source 12 may be controlled in one or more modes, such as a constant voltage (CV) regulation mode in which the control circuitry 30 controls the weld voltage to be substantially constant while varying the weld current during a welding operation. That is, the weld current may be based at least in part on the weld voltage. Additionally or alternatively, the power source 12 may be controlled in a current control mode in which the weld current is controlled independent of the weld voltage. In some examples, the power source 12 is controlled to operate in a constant current (CC) mode where the control circuitry 30 controls the weld current to be substantially constant while varying the weld voltage during a welding operation.

Figure 2:
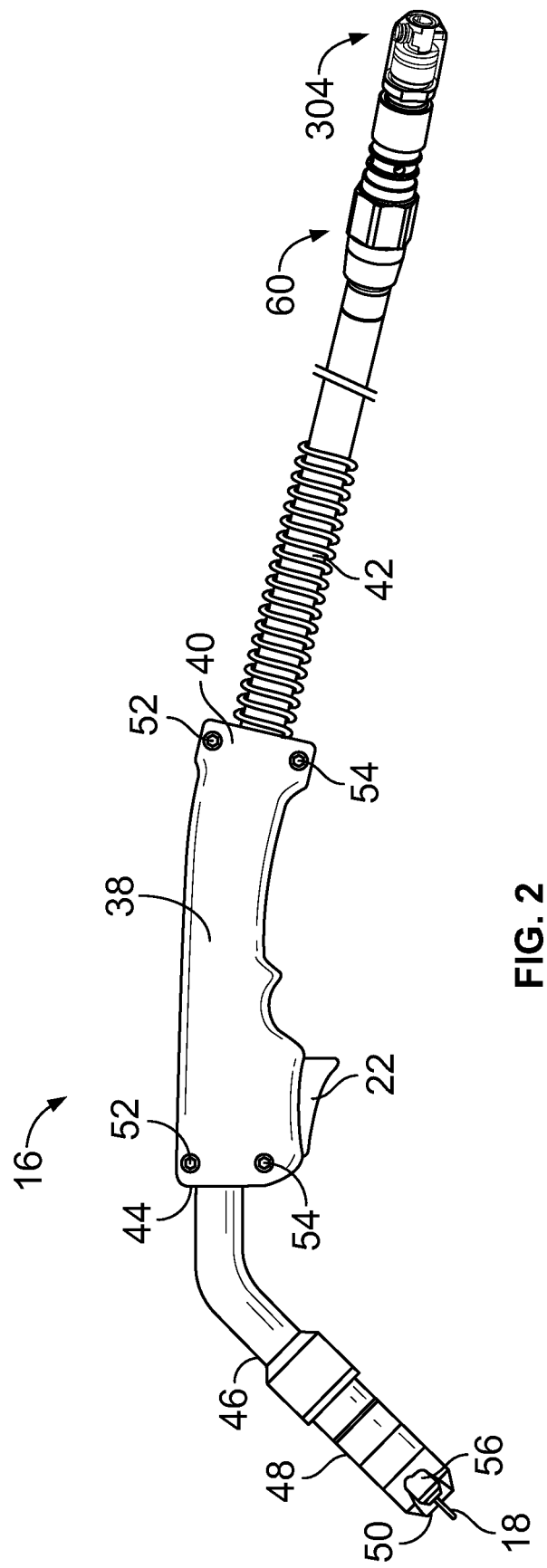
FIG. 2 is a side view of an example welding torch of the GMAW welding system of FIG. 1.

FIG. 2 is a side view of an example welding torch 16 of the GMAW welding system 10 of FIG. 1. The example torch 16 includes the trigger 22 for initiating a weld and supplying the electrode 18 to the weld. Specifically, the trigger 22 is disposed on a handle 38. A welding operator holds the handle 38 when performing a weld. At a first end 40, the handle 38 is coupled to a cable 42 where welding consumables (e.g., the electrode, the shielding gas, and so forth) are supplied to the weld. Welding consumables generally travel through the handle 38 and exit at a second end 44, which is disposed on the handle 38 at an end opposite from the first end 40.

The torch 16 includes a gooseneck 46 extending out of the second end 44 of the handle 38. As such, the gooseneck 46 is coupled between the handle 38 and a welding nozzle 48. As should be noted, when the trigger 22 is pressed or actuated, welding wire (e.g., electrode 18) travels through the cable 42, the handle 38, the gooseneck 46, and the welding nozzle 48, so that the welding wire extends out of an end 50 (i.e., torch tip) of the welding nozzle 48. Further, as illustrated in FIG. 2, the handle 38 is secured to the gooseneck 46 via fasteners 52 and 54, and to the cable 42 via fasteners 52 and 54. The welding nozzle 48 is illustrated with a portion of the welding nozzle 48 removed to show the electrode 18 extending out of a contact tip 56 that is disposed within the welding nozzle 48.

To connect the torch 16 to the wire feeder 14, a rear connector assembly 60 is disposed at a rear axial end of the welding torch cable 42. The rear connector assembly 60 serves to align the welding torch liner with a centerline of a corresponding connector of the wire feeder 14. The rear connector assembly 60 serves as an entry point of the welding wire into the welding torch 16. As discussed in more detail below, the rear connector assembly 60 includes a wire liner retention assembly to limit movement of a welding wire liner relative to the rear connector assembly 60, both axially and longitudinally, while maintaining ease of installation of welding wire liners.

The example torch 16 may be implemented using one or more of the features, components, and/or apparatus described in U.S. Patent Application Publication No. 2017/0165780, filed Dec. 6, 2016, and/or in U.S. Patent Application Publication No. 2017/0282278, filed Jun. 14, 2017. The entireties of U.S. Patent Application Publication No. 2017/0165780 and U.S. Patent Application Publication No. 2017/0282278 are incorporated herein by reference.

Figure 3:
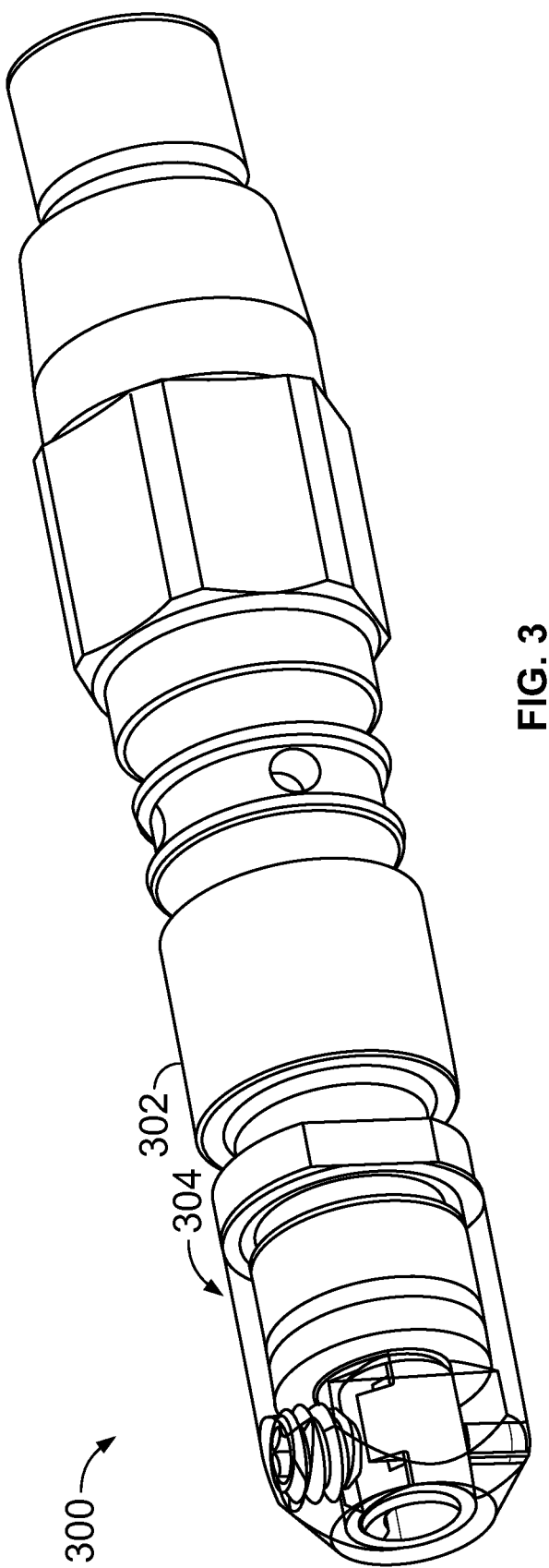
FIG. 3 is a perspective view of an example power connection assembly configured to connect the welding torch of FIG. 2 to sources of welding power and shielding gas, and including a wire liner retention device for limiting movement of a wire liner relative to the power connection assembly, in accordance with aspects of this disclosure.

FIG. 3 is a perspective view of an example power connection assembly 300 configured to connect the welding torch 16 of FIG. 2 to sources of welding power and shielding gas. The example power connection assembly 300 may be used to implement the rear connector assembly 60 of FIG. 2. FIG. 4 is an exploded side elevation view of the example power connection assembly 300 and wire liner retention device 304 of FIG. 3. FIG. 5 is an exploded perspective view of the example power connection assembly 300 and wire liner retention device 304 of FIG. 3.

The example power connection assembly 300 includes a power pin 302 and a wire liner retention device 304 for limiting movement of a wire liner relative to the power connection assembly. The power connection assembly 300 is connected to a welding torch cable (e.g., the cable 42 of FIG. 2) opposite the welding torch 16, and enables connection of the welding torch 16 to a wire feeder, a gas source, and/or a power supply for delivery of welding wire, shielding gas, and/or welding-type power to the welding torch 16 for a welding process.

As illustrated more clearly in FIGS. 4 and 5, the example wire liner retention device 304 includes a body 402, a clamp 404, and a compression adjustment mechanism 406. The body 402 is constructed from a conductive material, such as copper or brass, and has a bore 408 extending longitudinally (or lengthwise) through the body 402. The bore 408 permits passage of the welding wire liner through the body 402.

As illustrated in FIG. 4, the bore 408 includes multiple sections having different internal diameters. For example, a first section 410 of the bore 408 has an inner diameter greater than the outer diameter of the welding wire liner. In some examples, the inner diameter of the first section 410 is approximately equal to the outer diameter of the welding wire liner to reduce radial movement of the wire liner within the first section 410. The bore 408 further includes a second section 412 configured to house the clamp 404 and to receive the compression adjustment mechanism 406 for configuration of the clamp 404. The inner diameter of the second section 412 is greater than the inner diameter of the first section 410.

The example bore 408 further includes a third section 414 having an inner diameter greater than the inner diameter of the second section 412. The third section 414 is configured to receive a washer 416, which provides a seal between the welding wire liner and the body 402 to reduce or prevent leakage of shielding gas from the power pin 302. To provide the gas seal, an initial inner diameter of the washer 416 is smaller than an outer diameter of the welding wire liner. When the liner is inserted through the washer 416, the washer 416 deforms around the liner and creates the gas seal between the washer 416 and the liner.

The body 402 is coupled to the power pin 302 via the bore 408 adjacent the washer 416, such as via a press fit or threading. As illustrated in FIG. 3, the wire liner retention device 304 is installed onto the power pin 302, which compresses the washer 416 to reduce or prevent leakage of shielding gas from the body. However, an o-ring or any other compressible seal may be used instead of or in addition to the example washer 416.

The example clamp 404 includes an upper jaw 418 and a lower jaw 420. The upper jaw 418 and the lower jaw 420 are inserted into the second section 412 of the bore 408, and may be retained in the second section 412 by, for example, insertion of a spring pin 422 through the body 402 into the lower jaw 420. The lower jaw 420 is unable to move axially within the bore 408 and unable to rotate within the bore 408. The upper jaw 418 floats within the lower jaw 420 and is prevented from moving axially out of the lower jaw 420 or rotationally within the lower jaw 420. The upper jaw 418 is only permitted to move radially inward toward the center of the lower jaw 420 and is limited in range of travel. The bore 408 also limits radial movement of the upper jaw 418 in the radial outward direction.

The clamp 404 applies a compression force to the welding wire liner over a length of the clamp 404. The clamp 404 spreads the compressive force of the compression adjustment mechanism out over a number of coils of the liner, thereby reducing or preventing liner bowing (e.g., reduction of inner diameter) in this area of compression. In some examples, the clamp 404 is between 0.25 and 0.5 inches long, so as to avoid a concentration of compression force on the welding wire liner that could cause extrusion of the insulation of the welding wire liner into and between the coils of the liner, and/or deflection of the welding wire liner that could reduce the inner diameter of the welding wire liner.

The example lower jaw 420 includes tabs 422a, 422b, and the upper jaw 418 includes corresponding slots 424a, 424b. The tabs 422a, 422b and the slots 424a, 424b, in combination with the body 402, prevent longitudinal movement of the upper jaw 418 relative to the lower jaw 420.

As shown in the illustrated example, the lower jaw 420 includes stop surfaces 426 which stop movement of the upper jaw 418 toward the lower jaw 420 when the upper jaw 418 (e.g., opposing surfaces of the upper jaw 418) is forced into contact with the stop surfaces 426 (e.g., via the compression adjustment mechanism 406). In some examples, the lower jaw 420 and the stop surfaces 426 are dimensioned to limit the compression of the welding wire liner (and resulting deflection of the welding wire liner and/or reduction of internal diameter of the liner).

The example compression adjustment mechanism 406 includes a set screw 428 threaded radially through a threaded through-hole 430 in the body 402. When the clamp 404 is installed in the body 402 and the welding wire liner is positioned in the clamp 404, the set screw 428 may be turned to move the upper jaw 418 increase or decrease the compression applied by the upper jaw 418 and the lower jaw 420 on the liner.

The example body 402 includes a protrusion, contour, or other geometry to indicate that the compression adjustment mechanism 406 is set such that the compressive force is within a predetermined range. In the example of FIG. 4, the exterior of the body 402 includes a contour 432 adjacent the through-hole 430. The contour 432 indicates a depth for the set screw 428, such that the top of the set screw 428 is to be below (e.g., radially closer than) the contour 432 to achieve the desired or intended compression to effectively limit liner movement.

Figure 6:
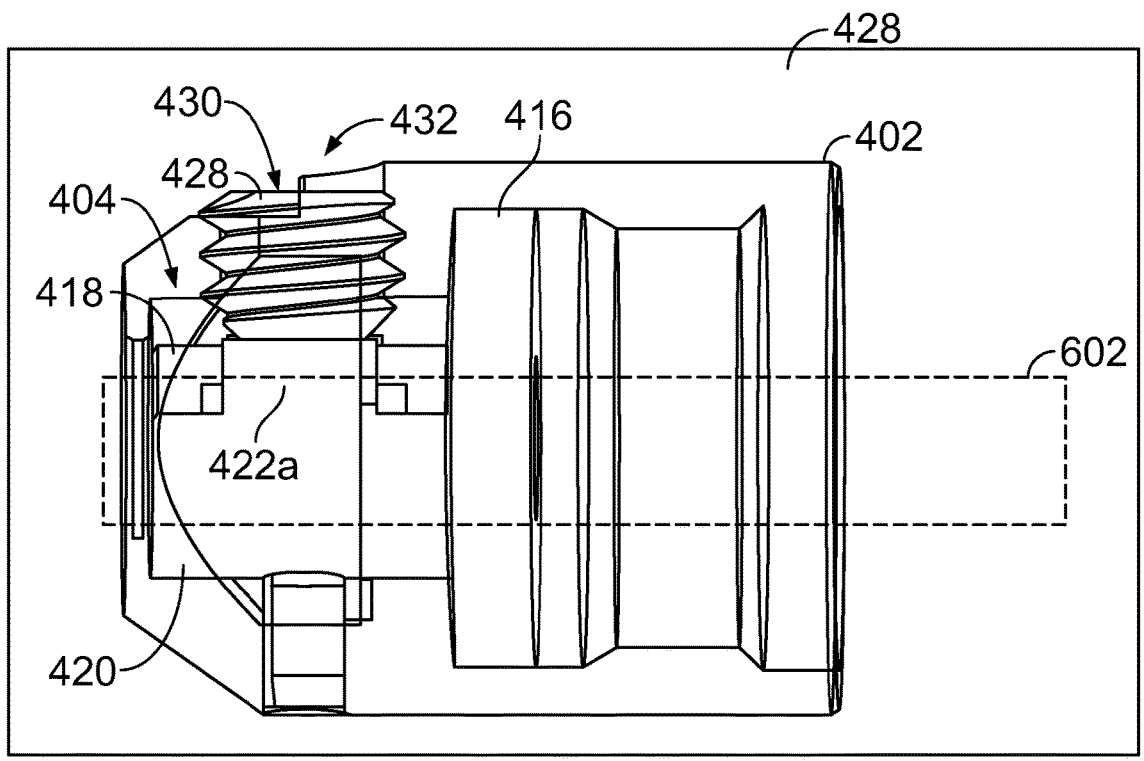
FIG. 6 is a side elevation view of the wire liner retention device of FIG. 3.
Figure 7:
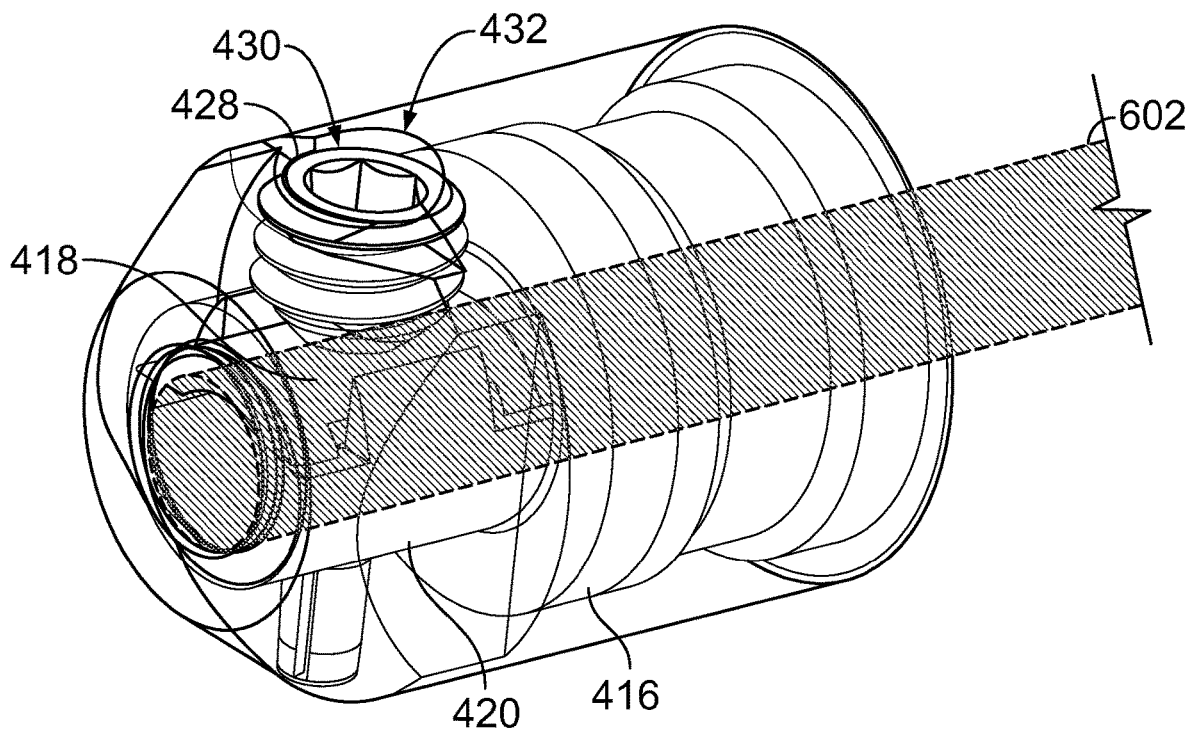
FIG. 7 is a perspective view of the wire liner retention device of FIG. 3.

FIG. 6 is a side elevation view of the assembled wire liner retention device 304 of FIG. 3. FIG. 7 is a perspective view of the assembled wire liner retention device 304 of FIG. 3. The example wire liner retention device 304 of FIGS. 6 and 7 further illustrates an installed wire liner 602.

Figure 8A:
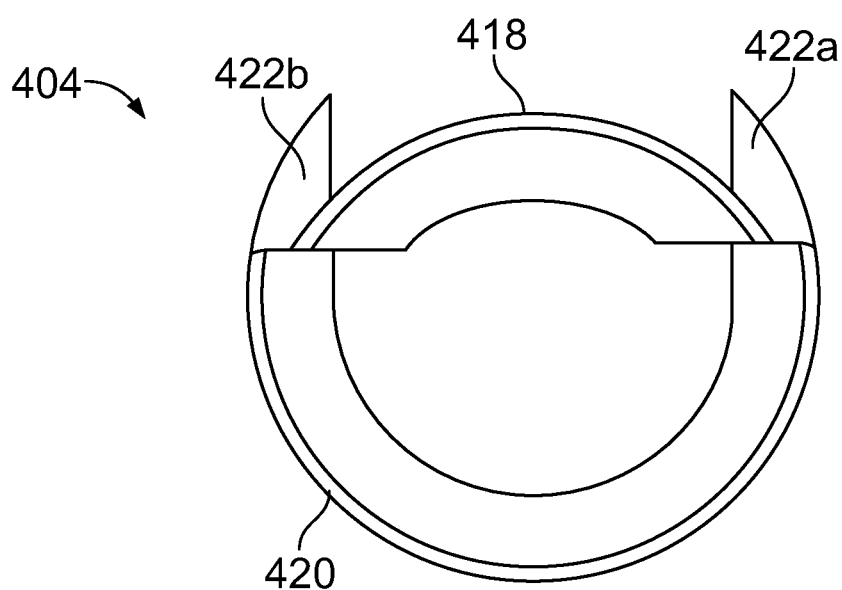
FIG. 8A is a front elevation view of the example jaws of the wire liner retention device of FIGS. 3 and 4 in a fully compressed position.
Figure 8B:
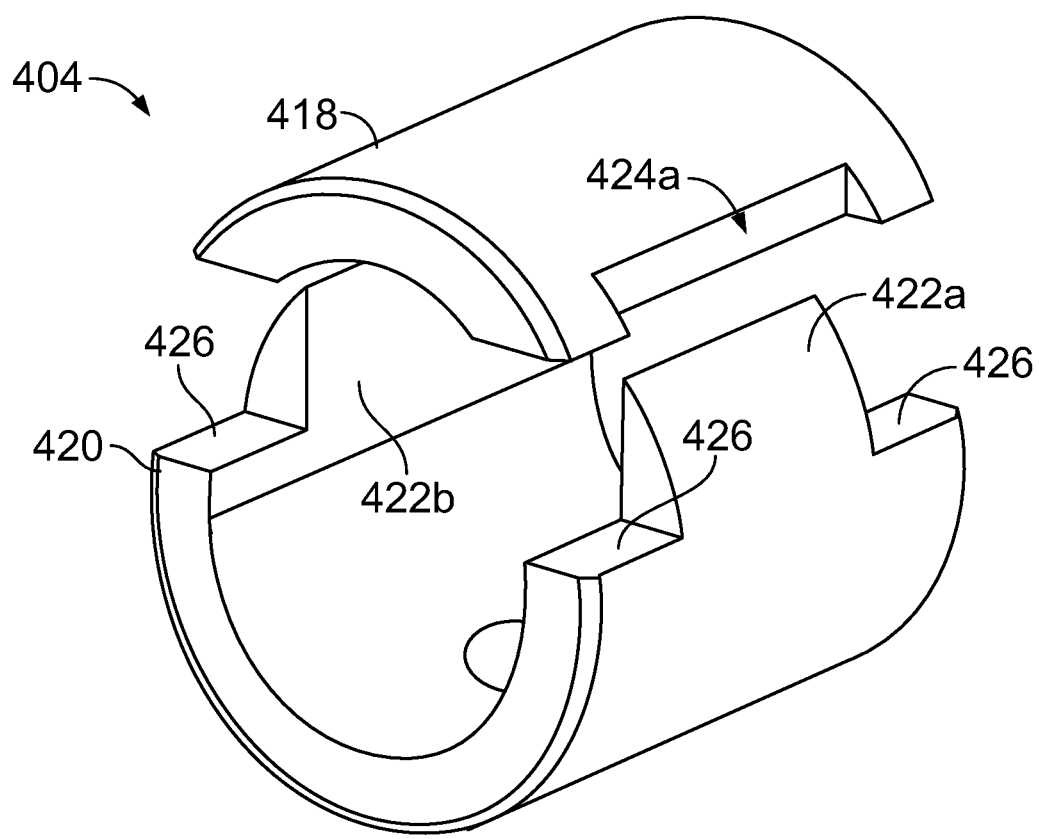
FIG. 8B is a perspective view of the example jaws of the wire liner retention device in a separated position.
Figure 9A:
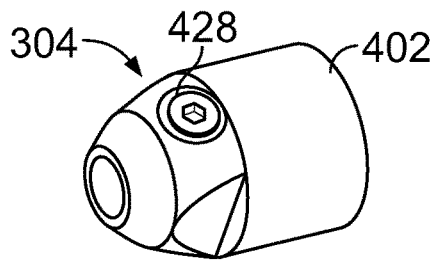
FIGS. 9A-9E illustrate example body components that may be used to implement the wire liner retention device of FIG. 3.
Figure 9B:
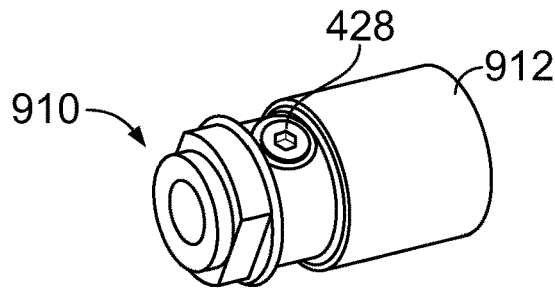
Figure 9C:
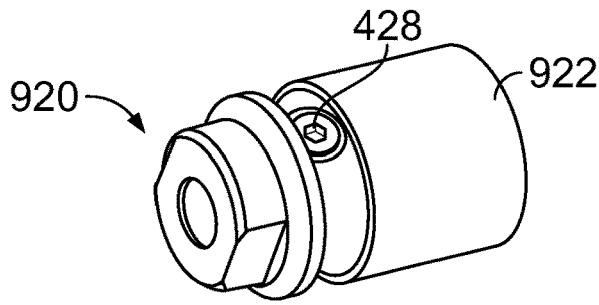
Figure 9D:
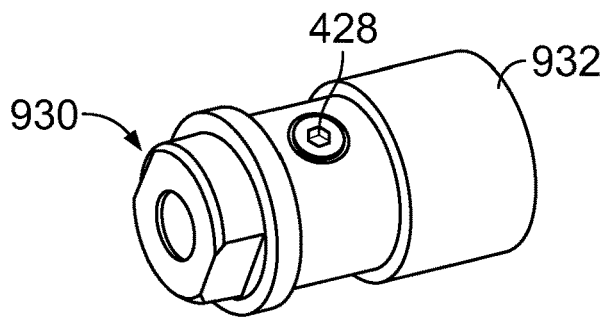
Figure 9E:
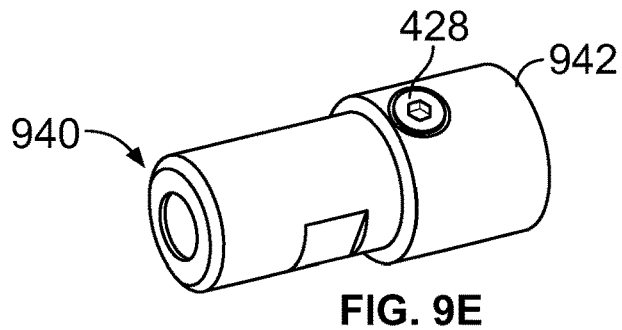

FIG. 8A is a front elevation view of the example jaws 418, 420 of the wire liner retention device 304 of FIGS. 3 and 4 in a fully compressed position. FIG. 8B is a perspective view of the example jaws 418, 420 of the wire liner retention device 304 in a separated position.

FIGS. 9A-9E illustrate example wire liner retention devices 304, 910, 920, 930, 940 including different styles of body components 402, 912, 922, 932, 942, which may be used to implement the wire liner retention device 304 of FIG. 3. In particular, each of the example body components 402, 912, 922, 932, 942 has a different external profile and/or a different internal bore profile. Each of the different body components 402, 912, 922, 932, 942 may be used to connect the power pin 302 of FIG. 3 (or a different power pin) to a corresponding style of power, wire, and/or gas connection.

Figure 10:
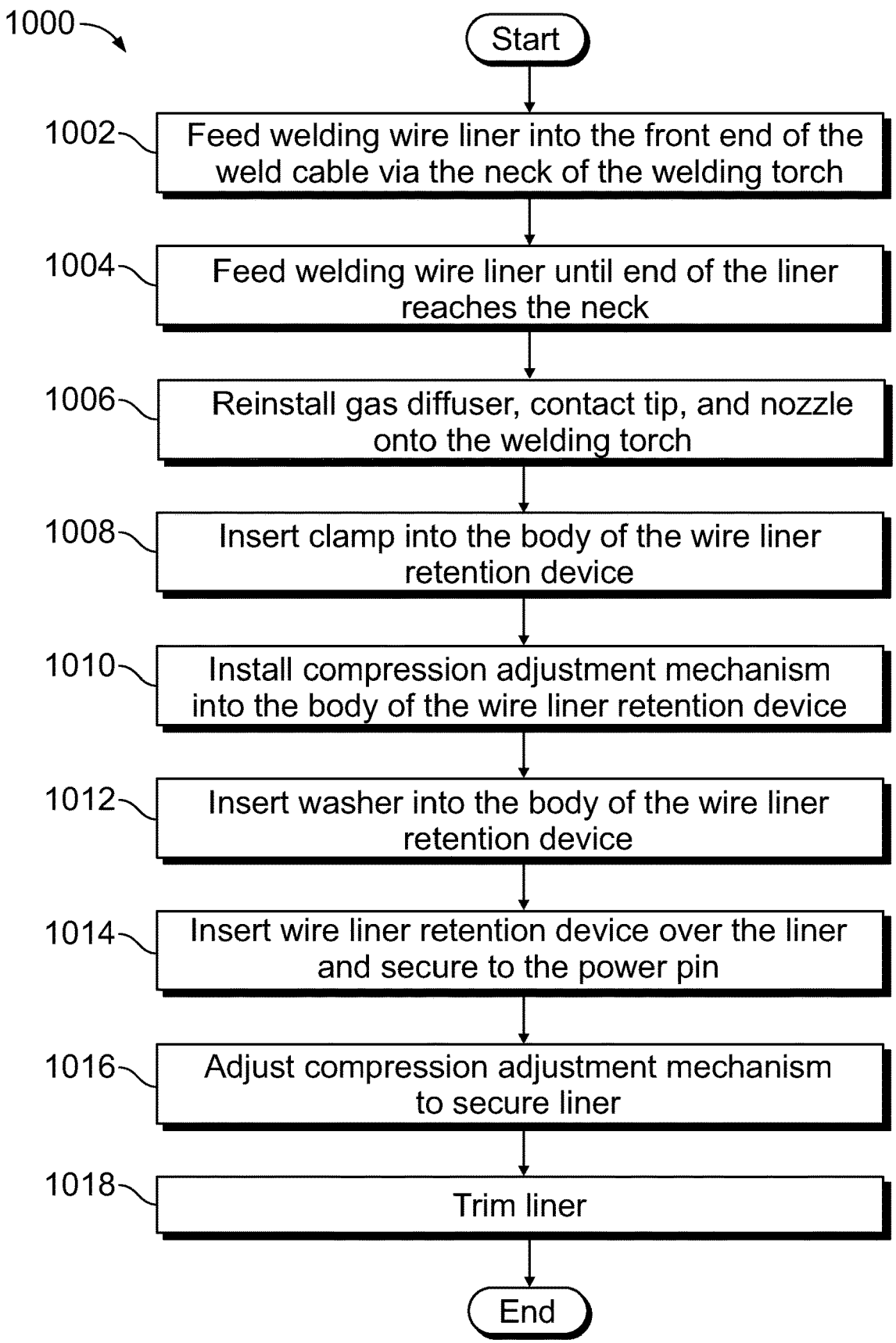
FIG. 10 is a flowchart representative of an example method that may be performed to install a welding wire liner into a welding torch including the example wire liner retention device of FIGS. 3-6.

FIG. 10 is a flowchart representative of an example method 1000 that may be performed to install a welding wire liner into a welding torch including the example wire liner retention device 304 of FIGS. 3-6. The example method 1000 may be performed by a weld operator or other individual, and begins when there is no welding wire liner present in the torch, cable, or connector, and the nozzle, contact tip, and gas diffuser are removed from the torch, and the wire liner retention device 304 is detached from the power pin 302.

At block 1002, the operator feeds a welding wire liner into the front end of the weld cable via the neck of the welding torch.

At block 1004, the operator continues feeding the welding wire liner until an end of the liner reaches the neck of the torch. In some examples, the welding wire liner includes a stopping or locking device at the end of the liner, which secures the welding wire liner at the torch end of the liner.

At block 1006, the operator reinstalls the gas diffuser, the contact tip, and the nozzle onto the welding torch.

At block 1008, the operator inserts a clamp (e.g., the clamp 404 of FIG. 4) into the body (e.g., the body 402 of FIG. 4) of the wire liner retention device 304. For example, the operator may insert the jaws 418, 420 into the second section 412 of the bore 408.

At block 1010, the operator installs the compression adjustment mechanism 406 (e.g., the set screw 428) into the body 402 of the wire liner retention device. When installed, the set screw 428 is aligned with the upper jaw 418 in the radial direction.

At block 1012, the operator inserts the washer 416 into the body 402 (e.g., into the third section 414 of the bore 408). In some examples, one or more of blocks 1008, 1010, and/or 1012 may be performed prior to the method 1000 (e.g., by a manufacturer, by an equipment manager, by the operator, etc.), such that the wire liner retention device 304 is assembled prior to installation of the wire liner retention device 304.

At block 1014, the operator installs the wire liner retention device 304 over the liner (e.g., the liner 602 of FIG. 6), and secures the wire liner retention device 304 to the power pin 302. For example, the operator may pass the length of the liner that extends out of the power pin 302 through the bore 408 (e.g., through the washer 416, through the clamp 404, and out of the first section 410 of the bore 408).

At block 1016, the operator adjusts the compression adjustment mechanism 406 to secure the liner 602. For example, the operator may turn the set screw 428 to force the upper jaw 418 toward the lower jaw 420, which increases the compression force on the liner 602. The operator may turn the set screw 428 at least until the set screw 428 is below the contour 432 or other geometry of the body 402, and/or until the upper jaw 418 reaches the stop surface(s) 426 on the lower jaw 420.

At block 1018, the operator trims the liner 602. In some examples, the operator may trim the liner 602 flush with the end of the wire liner retention device 304. However, the operator may adjust the trim length of the liner 602 as needed. The example method 1000 then ends.

Figure 11:
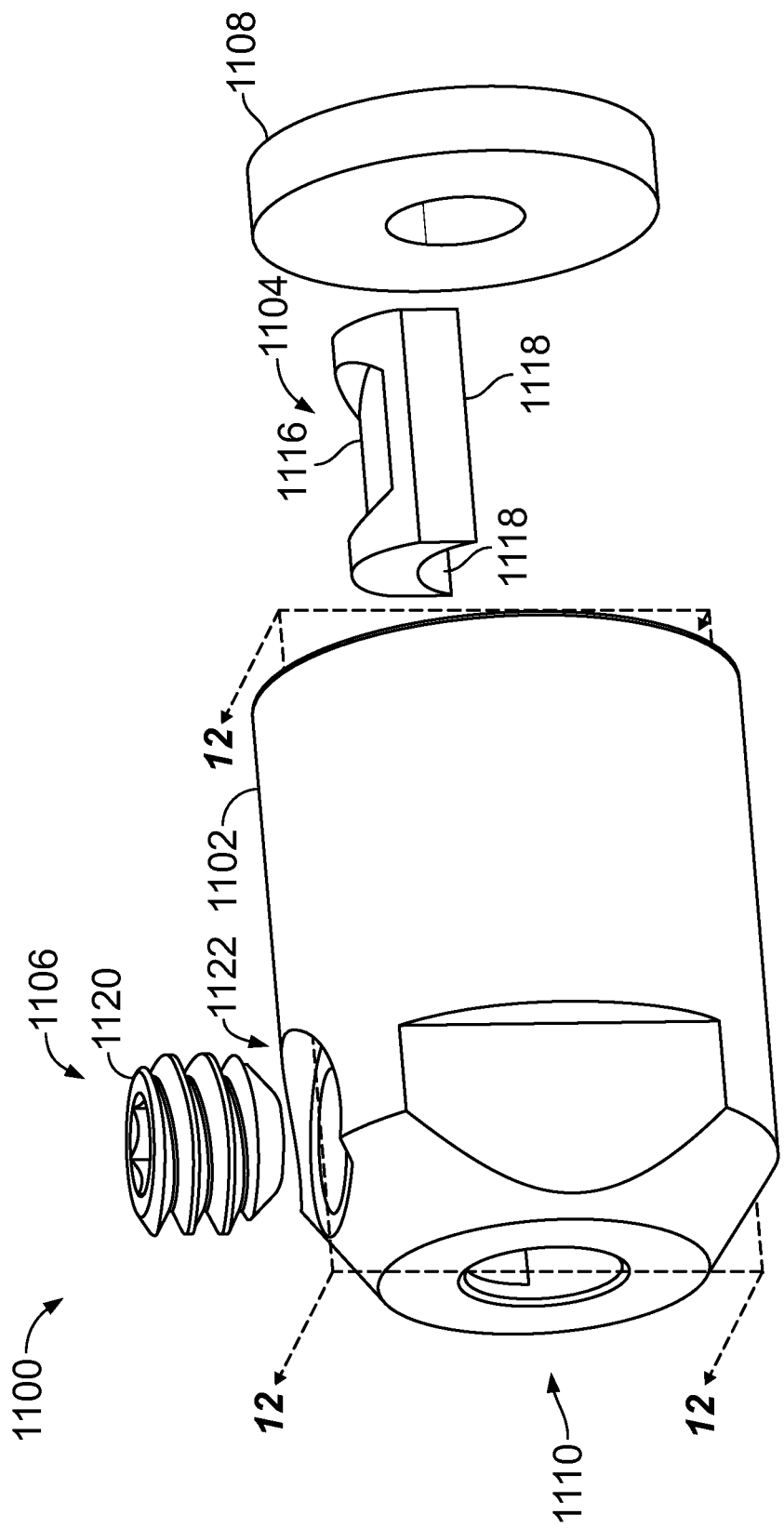
FIG. 11 is an exploded view of another example wire liner retention device that may be used to implement the wire liner retention device of FIG. 3.
Figure 12:
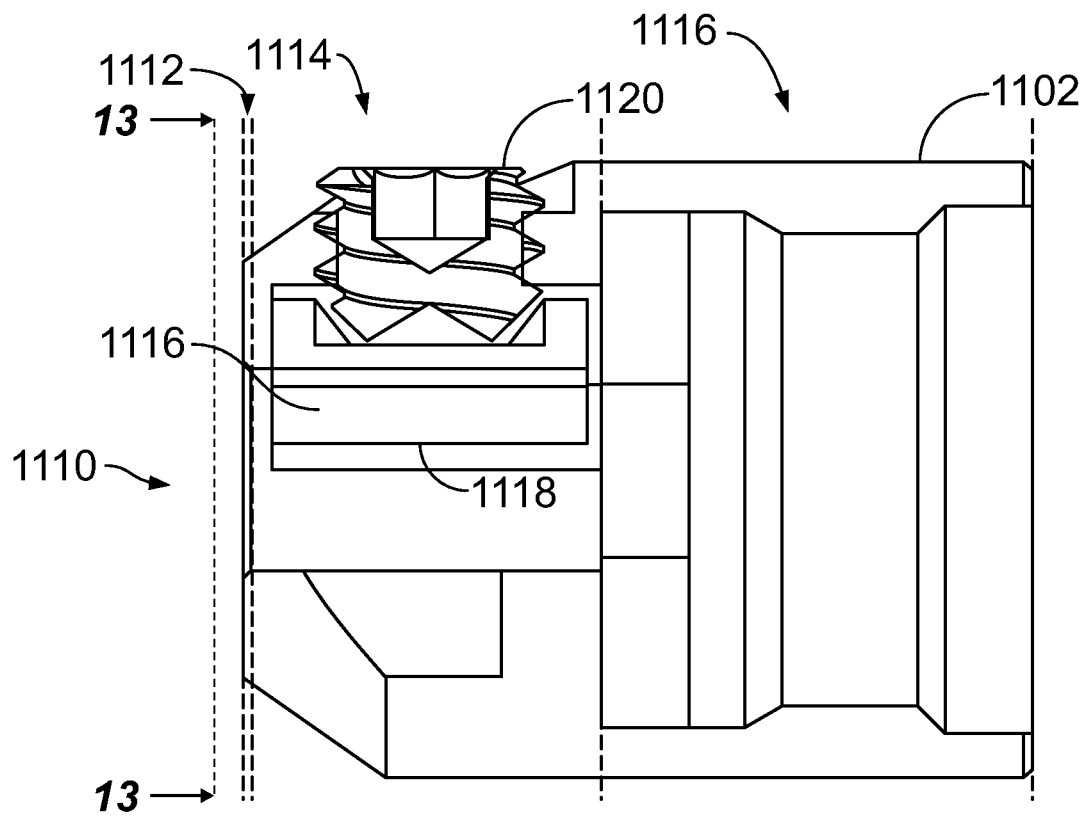
FIG. 12 is a sectioned side elevation view of the example wire liner retention device of FIG. 11.
Figure 13:
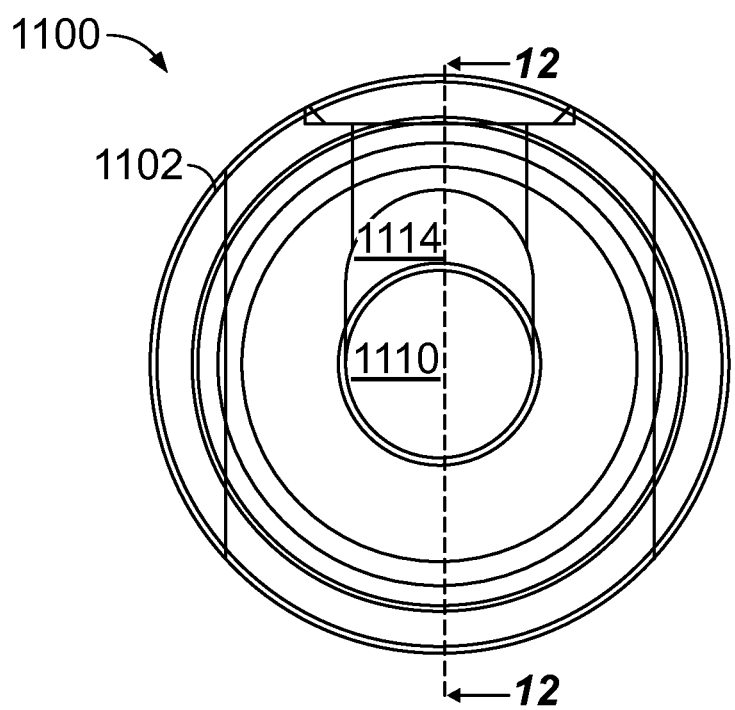
FIG. 13 is a front elevation view of the example wire liner retention device of FIG. 11.

In some examples, the lower jaw may be partially or completely integral with the body, and the upper jaw may engage with the portion of the body implementing the lower jaw. FIG. 11 is an exploded view of another example wire liner retention device 1100 that may be used to implement the wire liner retention device 304 of FIG. 3. FIG. 12 is a sectioned side elevation view of the example wire liner retention device 1100 of FIG. 11. FIG. 13 is a front elevation view of the example wire liner retention device 1100 of FIG. 11.

The example wire liner retention device 1100 includes a body 1102, a clamp 1104, a compression adjustment mechanism 1106, and a washer 1108. The example body 1102 is similar to the body 402 of FIG. 4, and a bore 1110 having multiple bore sections 1112, 1114, 1116. Each of the bore sections 1112, 1114, 1116 has a different inner diameter. The body 1102 of FIGS. 11-13 has a second bore section 1112 in which the clamp 1104 is inserted to apply a compressive force to a wire liner to limit movement.

In the example of FIGS. 11-13, the clamp 1104 includes a single jaw 1116 to apply a compressive force to the welding wire liner as the liner extends through the bore 1108. In contrast with the body 402, the second bore section 1112 provides both a movement restriction for the jaw 1116 and a stop surface. For example, as the jaw 1116 is moved in the radial direction toward the wire liner, rigid stop surfaces 1118 on opposing sides of the jaw 1116 are urged into contact with the walls of the second bore section 1112 as the width of the second bore section 1112 decreases.

The example compression adjustment mechanism 1106 is a set screw 1120, similar or identical to the set screw 428 of FIG. 4, and controls the compression applied by the jaw 1116 and the body 1102 to the welding wire liner. The body 1102 may include a protrusion 1122, contour, or other geometry, similar to the contour 432 of FIG. 4, to indicate a position for the set compression adjustment mechanism 1106 to apply a desired level of compression to the clamp 1104.

Additionally or alternatively, other clamping techniques may be used instead of the jaws 418, 420 and/or the jaw 1116 and the body 1102.

Figure 14:
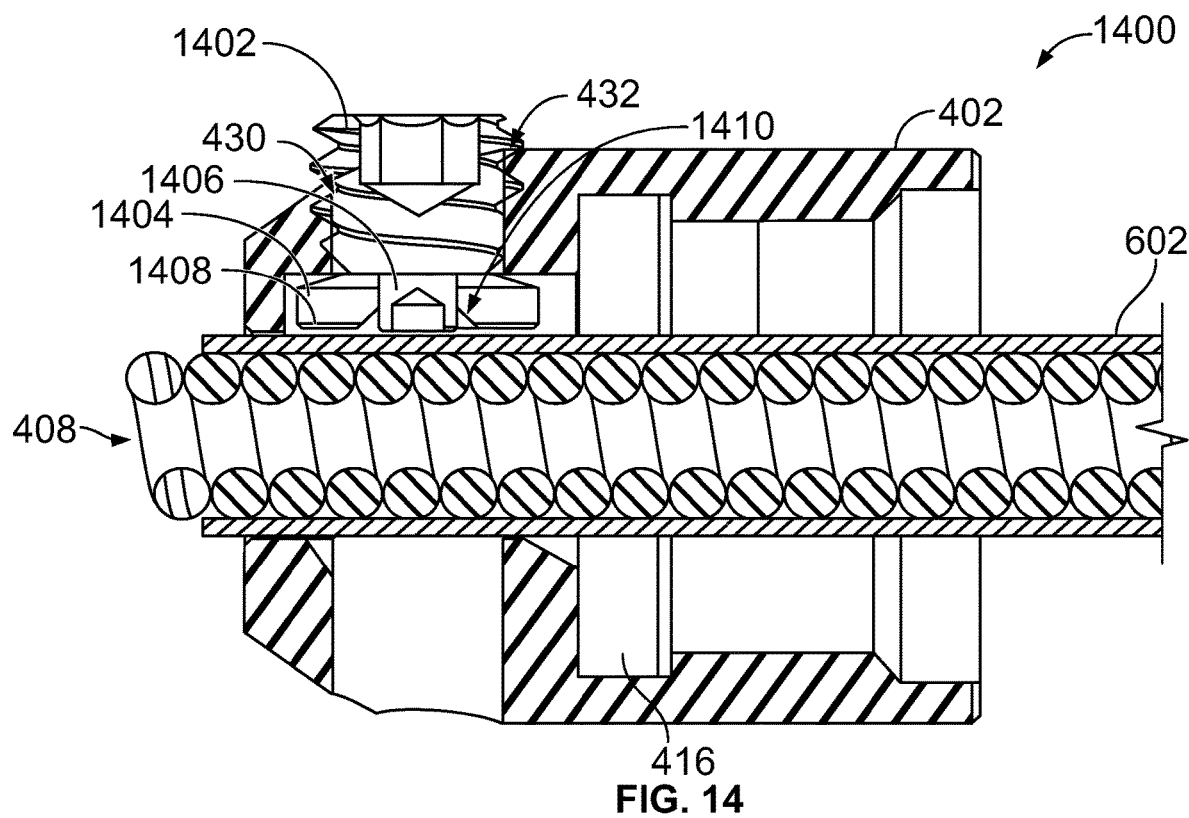
FIG. 14 is a sectioned side elevation view of another example wire liner retention device in which a set screw is fastened to a clamp, via an extension of the set screw, to improve release of the liner by the clamp and to hinder uninstallation of the set screw and the clamp from the wire liner retention device.
Figure 15:
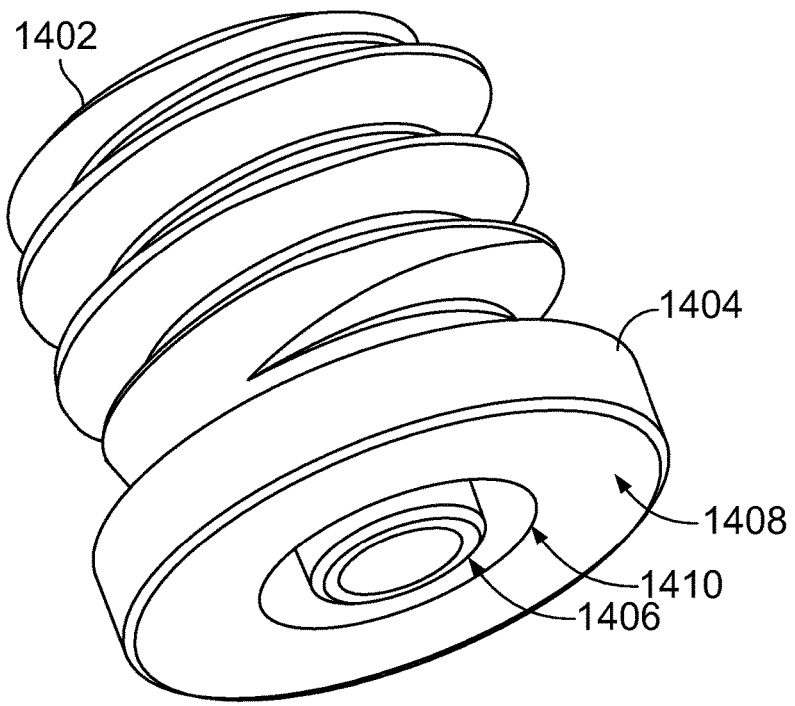
FIG. 15 is a perspective view of the example wire liner retention device of FIG. 14.

FIG. 14 is a sectioned side elevation view of another example wire liner retention device 1400 in which a set screw 1402 is fastened to a clamp 1404, via an extension 1406 of the set screw 1402, to improve release of the liner 602 by the clamp 1404. FIG. 15 is a perspective view of the example wire liner retention device 1400 of FIG. 14. The example wire liner retention device 1400 includes the body 402 of FIG. 6, which includes the bore 408, the threaded through-hole 430, and the contour 432.

The example clamp 1404 of FIG. 14, which may be considered as a jaw opposite a second, static jaw implemented by the body 402, has a flat contact surface 1408 and a countersunk bore 1410. The bore 1410 of the clamp 1404 permits insertion of the extension 1406 of the set screw 1402. Following insertion of the extension 1406 into the bore 1410, the extension 1406 may be mechanically deformed or otherwise expanded or secured (e.g., into the countersink of the bore 1410) to secure the set screw 1402 to the clamp 1404. In the example of FIG. 14, the clamp 1404 may rotate freely about the extension 1406 of the set screw 1402 to reduce friction forces and torque required to tighten the set screw 1402. Additionally, securing the set screw 1402 to the clamp 1404 through the bore 1410 of the set screw 1402 hinders removal from the body 402 and possible loss of the set screw 1402 and clamp 1404 by the operator.

When tightened, the set screw 1402 causes the clamp 1404 to press against the wire liner 602, to keep the wire liner 602 securely in place. The clamp 1404 applies a compression force to the welding wire liner 602 over a length of the clamp 1404. The clamp 1404 spreads the compressive force of the compression adjustment mechanism out over a number of coils of the liner 602, thereby reducing or preventing liner bowing (e.g., reduction of inner diameter) in this area of compression. In some examples, the clamp 1404 (e.g., the contact surface 1408) is between 0.25 and 0.5 inches long, so as to avoid a concentration of compression force on the welding wire liner 602 that could cause extrusion of the insulation of the welding wire liner 602 into and between the coils of the liner 602, and/or deflection of the welding wire liner 602 that could reduce the inner diameter of the welding wire liner 602. The retention of the extension 1406 by the clamp 1404 also causes the loosening of the set screw 1402 to disengage the clamp 1404 from the wire liner 602.

Figure 16:
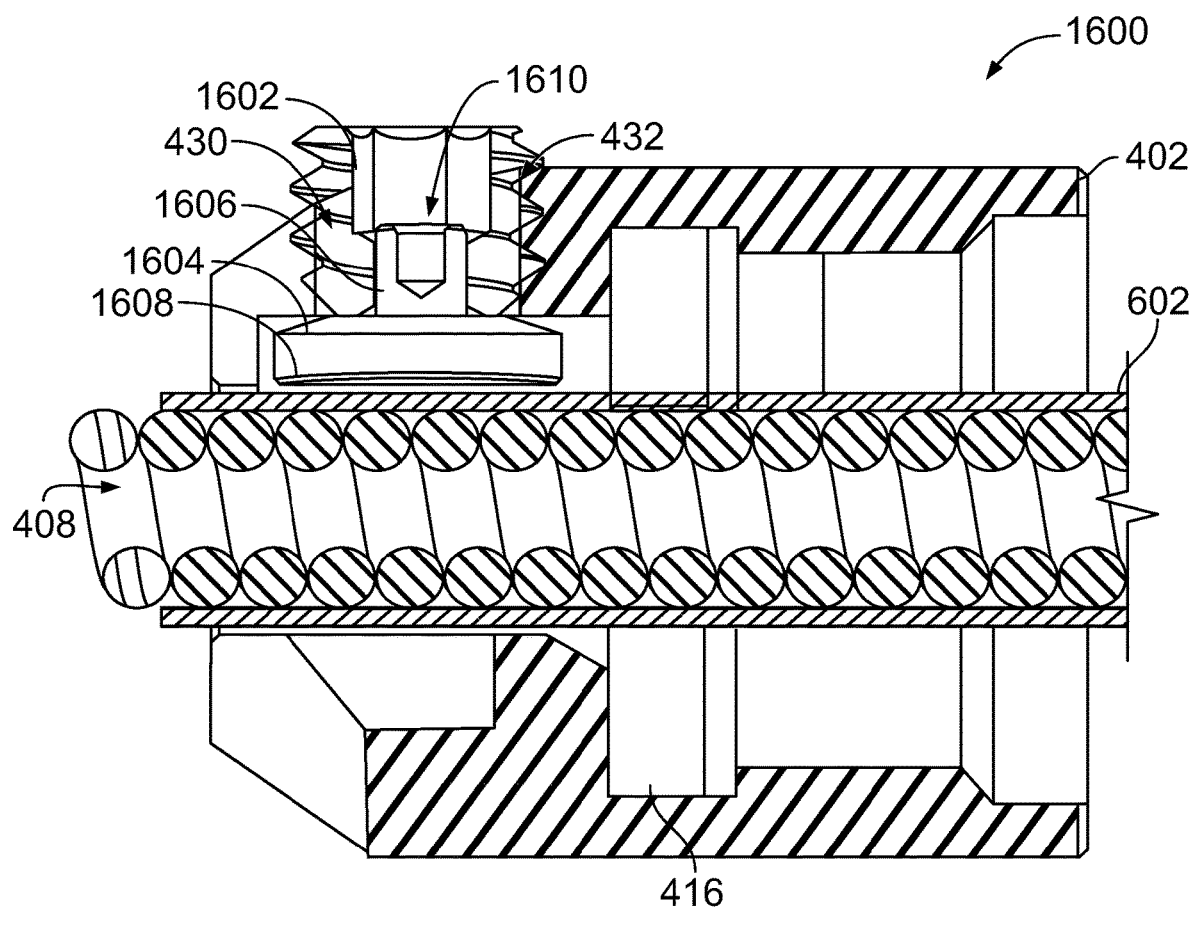
FIG. 16 is a sectioned side elevation view of another example wire liner retention device in which a set screw is fastened to a clamp, via an extension of the clamp, to improve release of the liner by the clamp and to hinder uninstallation of the set screw and the clamp from the wire liner retention device.
Figure 17:
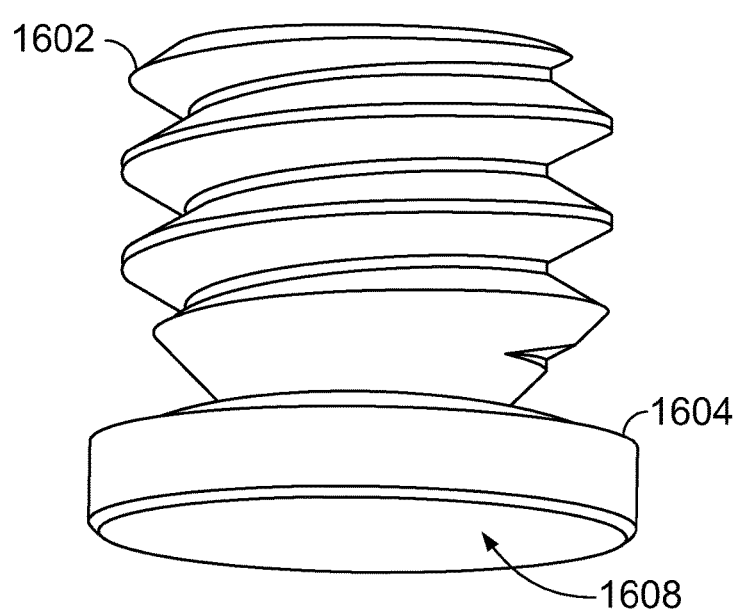
FIG. 17 is a perspective view of the example wire liner retention device of FIG. 16.

FIG. 16 is a sectioned side elevation view of another example wire liner retention device 1600 in which a set screw 1602 is fastened to a clamp 1604, via an extension 1606 of the clamp 1604, to improve release of the liner 602 by the clamp 1604. FIG. 17 is a perspective view of the example wire liner retention device 1600 of FIG. 16.

Like the clamp 1404 of FIG. 14, the clamp 1604 has a flat surface 1608 and is secured to the set screw 1602. The clamp 1604 may be considered as a jaw opposite a second, static jaw implemented by the body 402. In the example of FIG. 16, the clamp 1604 includes the extension 1606 (e.g., protrusion), which extends into a cavity or bore 1610 of the set screw 1602. After insertion, the extension 1606 may be mechanically deformed or otherwise secured within the bore 1610 of the set screw 1602. In the example of FIG. 16, the clamp 1604 may rotate freely with respect to the set screw 1602 to reduce friction forces and torque required to tighten the set screw 1602. Additionally, securing the set screw 1602 to the clamp 1604 through the bore 1610 of the set screw 1602 hinders removal from the body 402 and possible loss of the set screw 1602 and clamp 1604 by the operator.

When tightened, the set screw 1602 causes the clamp 1604 to press against the wire liner 602 to keep the wire liner 602 securely in place. The clamp 1604 applies a compression force to the welding wire liner 602 over a length of the clamp 1604. The clamp 1604 spreads the compressive force of the compression adjustment mechanism out over a number of coils of the liner 602, thereby reducing or preventing liner bowing (e.g., reduction of inner diameter) in this area of compression. In some examples, the clamp 1604 (e.g., the contact surface 1608) is between 0.25 and 0.5 inches long, so as to avoid a concentration of compression force on the welding wire liner 602 that could cause extrusion of the insulation of the welding wire liner 602 into and between the coils of the liner 602, and/or deflection of the welding wire liner 602 that could reduce the inner diameter of the welding wire liner 602. The retention of the extension 1606 by the set screw 1602 also causes the loosening of the set screw 1602 to disengage the clamp 1604 from the wire liner 602.

The example set screws 1402, 1602 and/or the clamps 1404, 1604 may be dimensioned to provide the desired clamping force against the wire liner 602 when the top surface of the set screw 1402, 1602 is substantially flush with the contour 432 of the body 402.

Figure 18:
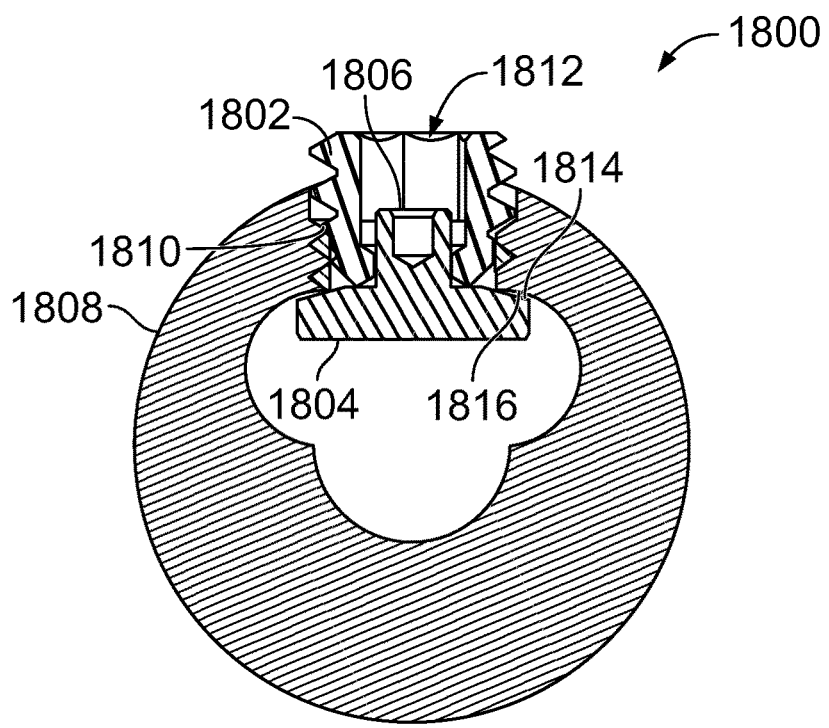
FIG. 18 is a sectioned side elevation view of another example wire liner retention device in which a set screw is fastened to a clamp, via an extension of the clamp, to improve release of the liner by the clamp and to prevent uninstallation of the set screw or the clamp from the wire liner retention device.
Figure 19:
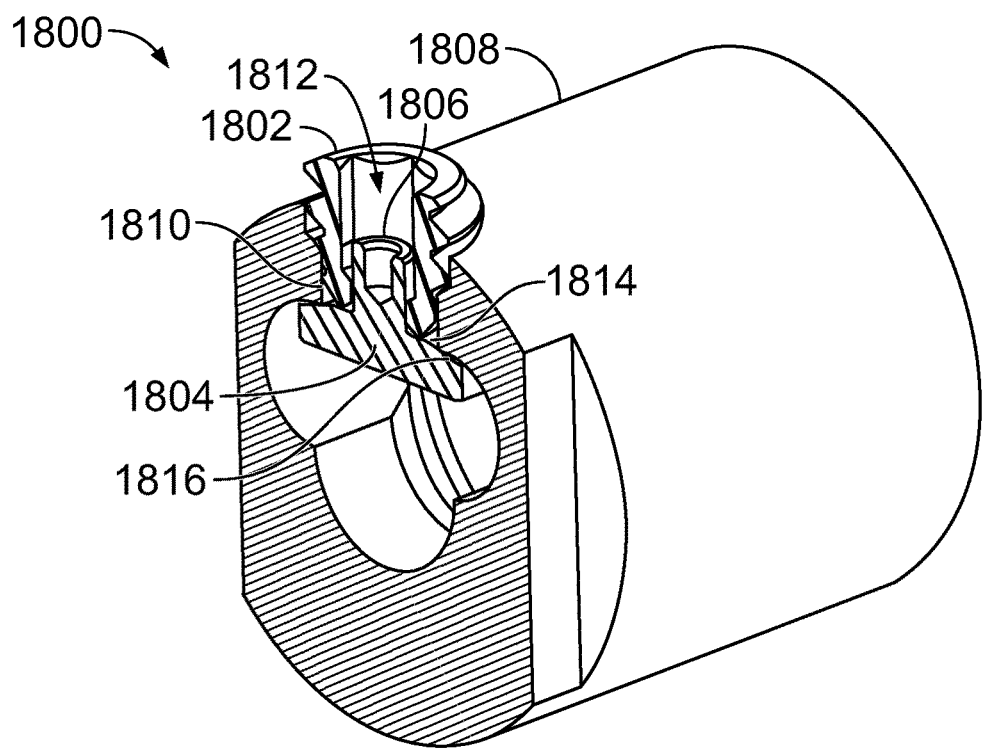
FIG. 19 is a perspective cross-section view of the example wire liner retention device of FIG. 18.

FIG. 18 is a sectioned side elevation view of another example wire liner retention device 1800 in which a set screw 1802 is fastened to a clamp 1804, via an extension of the clamp 1806. Like the example wire liner retention devices 1400, 1600 of FIGS. 14 and 16, the wire liner retention device 1800 improves release of the liner by the clamp 1804. The example wire liner retention device 1800 also prevents uninstallation of the set screw 1802 or the clamp 1804 from a body 1808. FIG. 19 is a perspective cross-section view of the example wire liner retention device 1800 of FIG. 18.

The wire liner retention device 1800 includes the body 1808, which has threads 1810 for tightening and loosening of the set screw 1802 to tighten or loosen the clamp 1804 against the liner. To install the clamp 1804, the clamp 1804 is inserted into the body 1808, and the set screw 1802 is screwed into the threads 1810 until the extension 1806 is inside a bore 1812 of the set screw 1802. The extension 1806 is then mechanically deformed or otherwise secured within the bore 1812. In the example of FIG. 18, the clamp 1804 may rotate freely with respect to the set screw 1802 to reduce friction forces and torque required to tighten the set screw 1802.

To prevent uninstallation of the set screw 1802 from the body 1808, the threads 1810, the set screw 1802, the clamp 1804, and the clamp extension 1806 are dimensioned such that the set screw 1802 disengages the threads 1810 prior to a top surface 1814 of the clamp 1804 contacting an interior surface 1816 of the body 1808. When a user unscrews the set screw 1802, the set screw 1802 will disengage the threads 1810 prior to application of force from the set screw 1802 to the top surface 1814 and the interior surface 1816 of the body 1808 via the extension 1806, which could cause separation of the set screw 1802 and the extension 1806. Instead, when the set screw 1802 disengages the threads 1810, the set screw 1802 may freely rotate with respect to the clamp 1804, while the extension 1806 retains the set screw 1802 to the body 1808. As a result, the set screw 1802 and the clamp 1804 remain fastened and secured within the body 1808 to avoid unintentional loss of the set screw 1802 and/or the clamp 1804.

While the foregoing examples use set screws to tighten and loosen the clamp, other types of fastening devices may be used. For example, bolts and/or other types of screws, such as machine screws, may replace the set screws.

Compared with conventional welding torches, example wire retention devices and welding torches disclosed herein provide improved liner retention to prevent liner movement, a more consistent welding torch performance (e.g., less sensitivity to component variation, compensation for differences in liners), easier product manufacturing and assembly, easier operator maintenance (e.g., visual indication of proper compression, maintaining ease of liner installation and trimming), and/or elimination of some or all torque requirements when maintaining the welding torch.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A wire liner retention apparatus, comprising:
   a body comprising a bore extending longitudinally through the body, the bore configured to permit passage of a welding wire liner through the bore;
   a clamp configured to apply a compressive force to the welding wire liner in a radial direction within the bore to limit movement of the welding wire liner with respect to the body, wherein the clamp comprises a first jaw and a second jaw arranged on opposing sides of the welding wire liner, and the compression adjustment mechanism is configured to urge the first jaw toward the second jaw to increase the compressive force applied by the clamp; and a compression adjustment mechanism configured to adjust the compressive force applied by the clamp, wherein the compression adjustment mechanism comprises a set screw configured to control the compressive force applied to the welding wire liner by the first jaw and the second jaw.

2. The wire liner retention apparatus as defined in claim 1, further comprising a compressible seal configured to provide a seal between the welding wire liner and the body.

3. The wire liner retention apparatus as defined in claim 1, wherein the body comprises at least one of a protrusion, geometry, or contour, which is configured to indicate that the compression adjustment mechanism is set such that the compressive force is within a predetermined range.

4. The wire liner retention apparatus as defined in claim 3, wherein the compression adjustment mechanism comprises a set screw threaded through the body in the radial direction.

5. The wire liner retention apparatus as defined in claim 1, wherein the bore has a first section having an inner diameter greater than the welding wire liner, and a second section having an inner diameter greater than the first section, wherein the clamp is positioned within the second section of the bore.

6. The wire liner retention apparatus as defined in claim 5, wherein the bore comprises a third section having an inner diameter greater than the second section, the third section configured to couple to a welding power pin.

7. The wire liner retention apparatus as defined in claim 1, wherein the second jaw comprises a stop surface configured to stop movement of the first jaw toward the second jaw beyond the stop surface.

8. The wire liner retention apparatus as defined in claim 1, wherein the clamp is configured to apply the compressive force over a length between 0.25 inches and 0.5 inches of the welding wire liner.

9. A welding torch, comprising:
  a contact tip assembly configured to conduct welding power to a welding wire;
  a welding cable configured to conduct the welding power to the contact tip assembly;
  a power pin configured to couple the welding cable to a welding-type power supply; and
  a wire liner retention device configured to limit movement of a welding wire liner relative to the power pin, the wire liner retention device comprising:
    a body comprising a bore extending longitudinally through the body, the bore configured to permit passage of the welding wire liner through the bore;
    a clamp configured to apply a compressive force to the welding wire liner in a radial direction within the bore to limit movement of the welding wire liner with respect to the body, wherein the clamp comprises a first jaw and a second jaw arranged on opposing sides of the welding wire liner, and the compression adjustment mechanism is configured to urge the first jaw toward the second jaw to increase the compressive force applied by the clamp; and
    a compression adjustment mechanism configured to adjust the compressive force applied by the clamp, wherein the compression adjustment mechanism comprises a set screw configured to control the compressive force applied to the welding wire liner by the first jaw and the second jaw.

10. The welding torch as defined in claim 9, wherein the power pin is configured to conduct shielding gas to the welding cable, the contact tip assembly comprises a gas diffuser configured to output the shielding gas, and the wire liner retention device comprises a compressible seal configured to provide a seal between the welding wire liner and the body.

11. The welding torch as defined in claim 9, wherein the body comprises at least one of a protrusion, geometry, or contour, which is configured to indicate that the compression adjustment mechanism is set such that the compressive force is within a predetermined range.

12. The welding torch as defined in claim 11, wherein the compression adjustment mechanism comprises a set screw threaded through the body in the radial direction.

13. The welding torch as defined in claim 9, wherein the bore has a first section having an inner diameter greater than the welding wire liner, and a second section having an inner diameter greater than the second section, wherein the clamp is positioned within the second section of the bore.

14. The welding torch as defined in claim 13, wherein the bore comprises a third section having an inner diameter greater than the second section, the third section configured to couple to a welding power pin.

15. The welding torch as defined in claim 9, wherein the second jaw comprises a stop surface configured to stop movement of the first jaw toward the second jaw beyond the stop surface.

16. The welding torch as defined in claim 9, wherein the clamp is configured to apply the compressive force over a length between 0.25 inches and 0.5 inches of the welding wire liner.

* * * * *